United States Patent [19]

Rehklau et al.

[11] 3,767,206

[45] Oct. 23, 1973

[54] CASSETTE TO CASSETTE DUPLICATING MEANS

[75] Inventors: George D. Rehklau, Los Altos Hills; Cecil W. DeLong, Sunnyvale, both of Calif.

[73] Assignee: Electro Sound Incorporated, Sunnyvale, Calif.

[22] Filed: Oct. 26, 1971

[21] Appl. No.: 192,397

[52] U.S. Cl. .................................... 243/3, 274/4 D

[51] Int. Cl. .............................................. G11b 5/86

[58] Field of Search .................. 274/3; 179/100.2 E; 312/320; 226/194, 188; 317/101 CB; 74/574

[56] References Cited

UNITED STATES PATENTS

| | | | |
|---|---|---|---|
| 3,683,123 | 8/1972 | Fukuda | 274/3 |
| 3,620,476 | 11/1971 | Cervantes | 179/100.2 E |
| 3,482,147 | 12/1969 | Kersten | 317/101 CB |
| 2,735,965 | 2/1956 | Balanda | 312/320 |
| 3,620,429 | 11/1971 | Kozu | 274/4 D |

*Primary Examiner*—Harry N. Haroian

*Attorney*—James P. Malone

[57] ABSTRACT

Cassette to cassette duplicating means are provided for reproducing cassette tape copies from a master cassette tape. A master cassette reproducer reproduces a program from a master tape. A modular interconnecting tray is adapted to mount one master reproducer and plurality of slave reproducers. The tray has a plurality of interconnected sockets to receive plugs in the reproducers. Additional trays may be plugged into the first tray to provide additional copies simultaneously.

4 Claims, 12 Drawing Figures

INVENTOR.

BY GEORGE D. REHKLAU
CECIL W. DeLONG

INVENTOR.

BY GEORGE D. REHKLAU
CECIL W. DeLONG

INVENTOR.

BY GEORGE D. REHKLAU
CECIL W. DeLONG

INVENTOR.

BY GEORGE D. REHKLAU
CECIL W. DeLONG

INVENTORS
GEORGE D. REHKLAU
CECIL W. DeLONG

SLAVE

INVENTOR.

BY GEORGE D. REHKLAU
CECIL W. DeLONG

CASSETTE TO CASSETTE DUPLICATING MEANS

This invention relates to means for simultaneously making a plurality of cassette tape copies from a master cassette tape.

The present cassette-to-cassette duplicating system are constructed on a completely modular basis. The master reproducer and each slave recorder are individual assemblies. The master exercieses primary control over the slaves, but other than this each assembly is wholly independent.

Our modular concept starts with interconnecting trays, which provide all necessary wiring between assemblies for the entire system. The main tray accommodates one master and two slaves, which plug into receptacles on the tray. This main tray also provides a fourth receptacle into which a subsidiary tray, for two slaves, can be plugged. Subsidiary trays can be added as necessary until the maximum eight-slave system is realized. This provides a building-block type design, where the original system can be ordered to cover demands of the moment, then one or more slaves added as duplicating requirements increase.

The receptacles on the trays are mounted on projections which nest with cavities on the modules. This provides a self-alignment between the pins and sockets when the modules are plugged in. A hasp lock secures the back of the module to the tray; the front of the module contains a lip which is secured in a slotted hole in the tray.

The master assembly provides operating controls for the complete system. Included in the master is the electronic circuitry for the re-program on the master tape. The reproduced signal is routed to all slaves through the interconnecting trays.

Each slave is completely independent of all other slaves. Each contains a recording head and a bias generator. Each can be connected to or removed from the system without affecting the operation of the rest of the system. Therefore, if only one copy is required from a multi-slave system it is necessary to run only one slave. Also, if one slave becomes deficient in any respect, either mechanically or electronically, it can be disconnected without any effect on system operation.

Accordingly, the principal object of the invention is to provide new and improved cassette to cassette duplicating means.

Another object of the invention is to provide new and improved cassette to cassette duplicating means having a master reproducer, a plurality of slave reproducers and interconnected tray adapted to mount and connect the reproducers.

Another object of the invention is to provide new and improved cassette to cassette duplicating means wherein all of the reproducers are modular.

Another object of the invention is to provide new and improved cassette to cassette duplicating means wherein the trays are modular and interconnectable.

Another object of the invention is to provide new and improved capstan means for cassette reproducers, said cassettes having spring loaded bearings and damped fly wheels to minimize flutter distortion.

These and other objects of the invention will be apparent on the following specification drawings of which:

Figure 10:
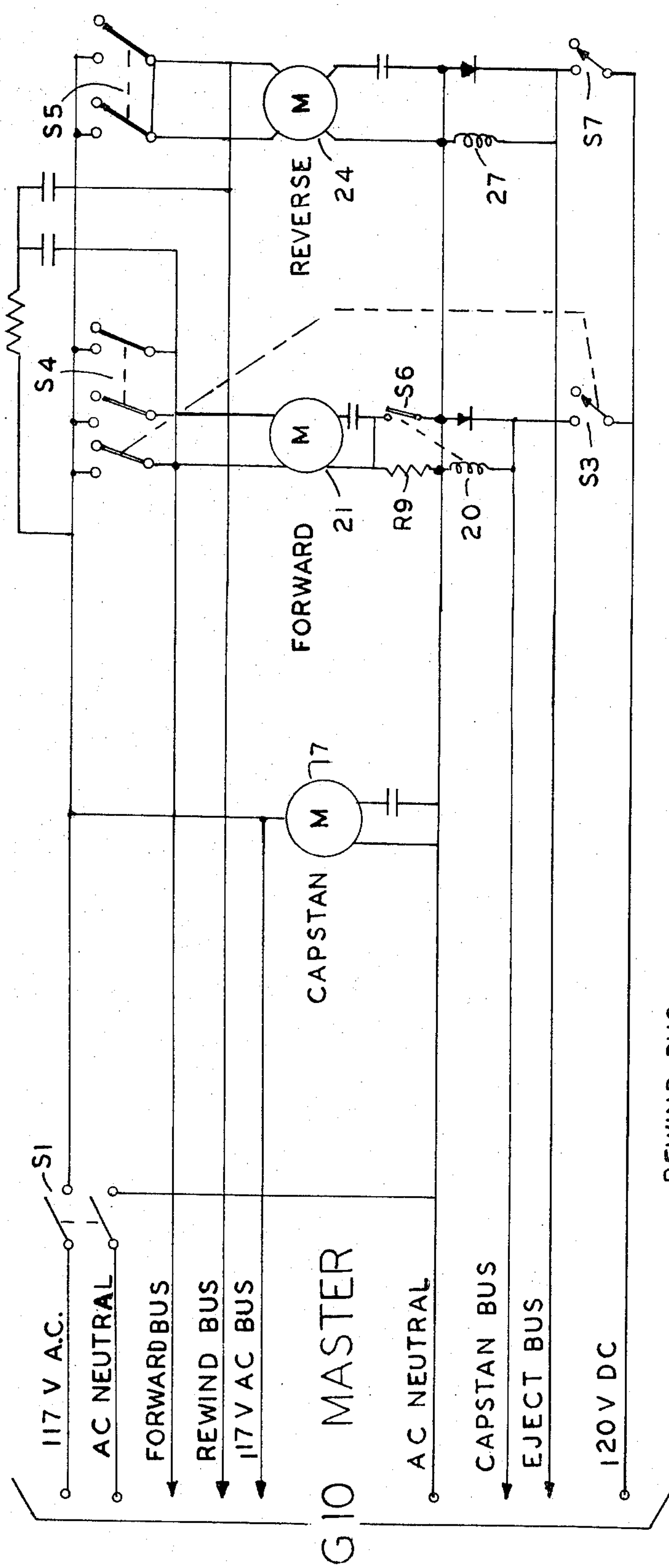
Figure 11:
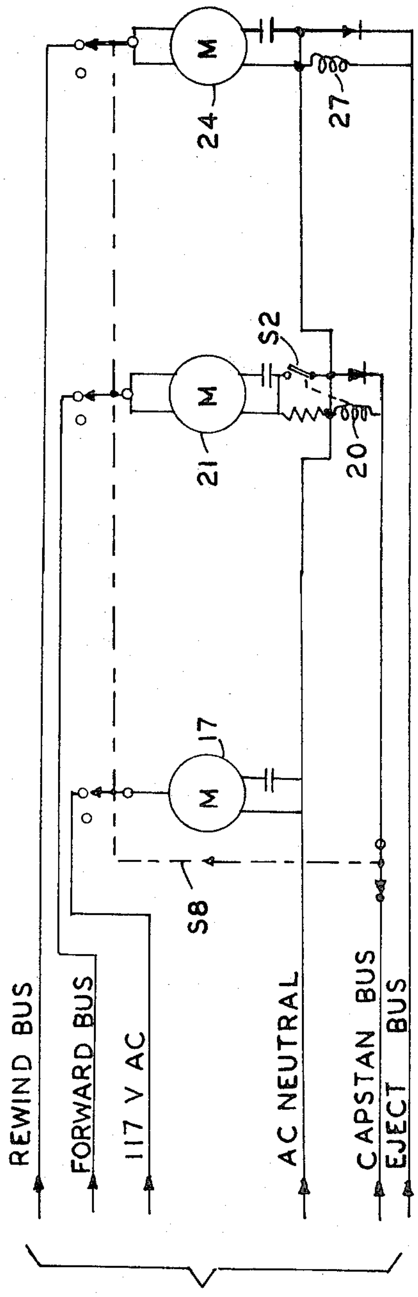

FIGS. 10, and 11, are schematic electrical diagrams.

Figures 5, 12:
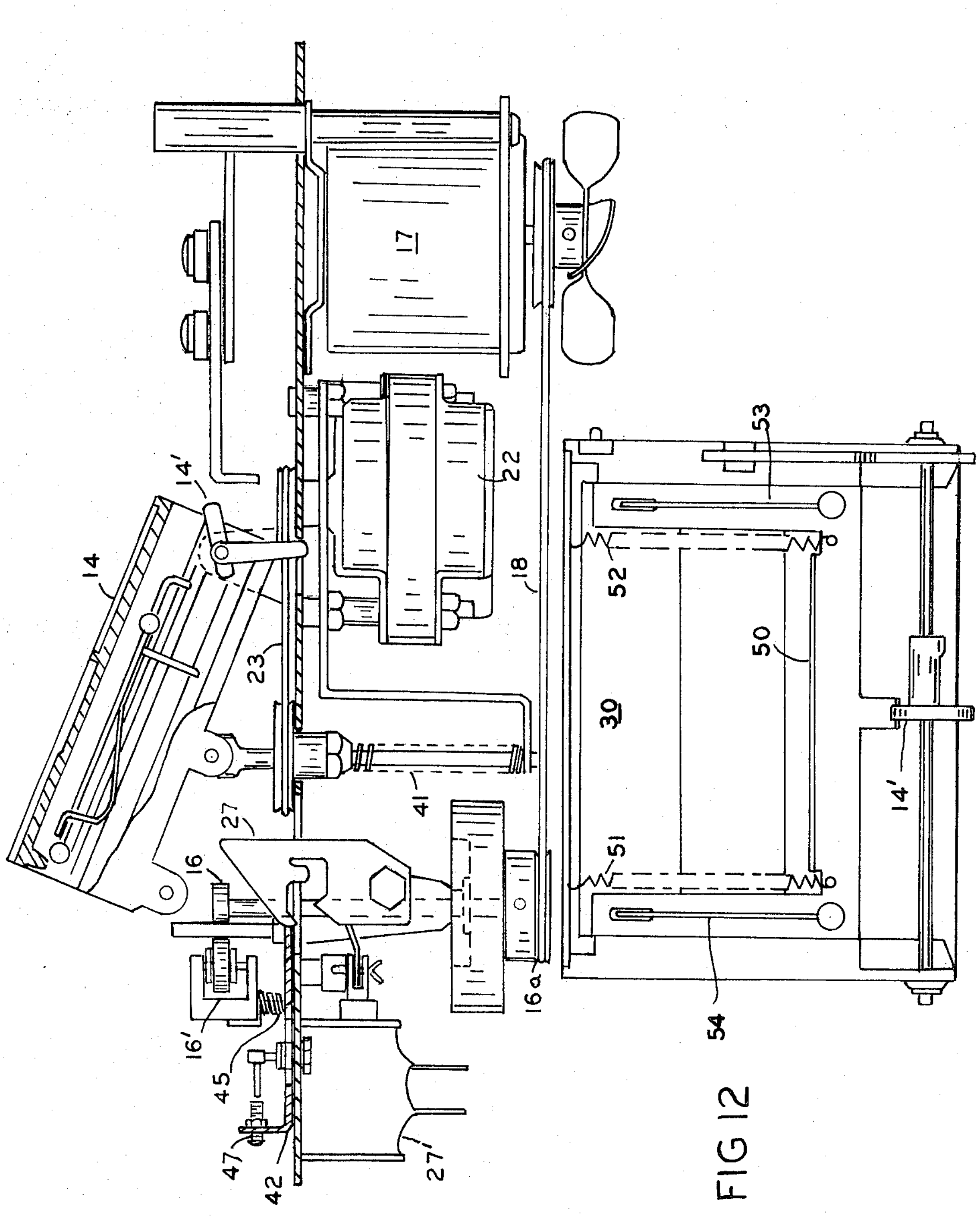
FIG. 5, is a side view of the FIG. 4 with the cassette holder included.

FIG. 12, is a bottom view of the cassette holder.

Figure 1:
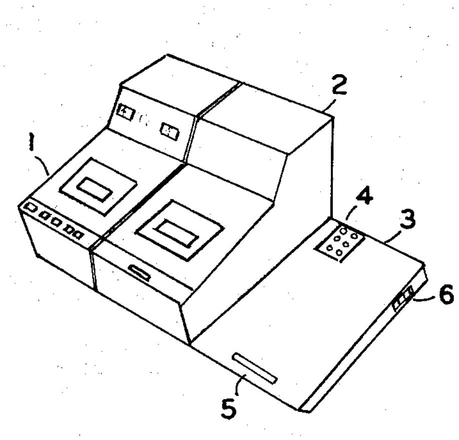
FIG. 1, is a perspective view of an embodiment of the invention.
Figure 2:
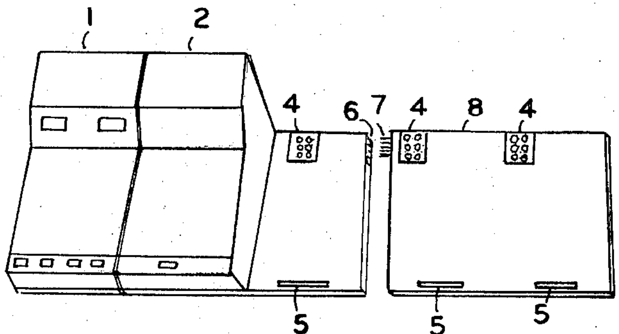
FIG. 2, is a perspective view of an embodiment of the invention showing modular trays.

FIG. 1 shows a master reproducer 1, and a slave reproducer 2, mounted on a interconnecting tray 3. The reproducers are modular and the tray 3, is adapted to mount one master and two slave reproducers. The tray contains all of the electrical interconnections and has a plurality of sockets 4, which are multi-contact, adapted to receive multi-contact plugs in the reproducers.

All of the controls are on the master reproducer which are adapted to control the slave reproducers from the interconnections in the tray. The trays have index slots 5, and the reproducers have projections which are adapted to fit into the slots 5, to align the plug and socket connections.

The tray 3, also has an output socket 6, which is adapted to receive a plug 7, mounted in another modular tray 8, which is adapted to receive two more slave reproducers. The tray 8, also has an output socket to accommodate another tray if desired.

Due to the modular construction of the reproducers and the trays it is possible to simultaneously reproduce a plurality of cassette tape copies, for instance, one to eight copies may be made by interconnecting four trays and eight reproducers. All the slave reproducers are independent of each other so that if there is a malfunction in one of them it will not effect the others.

Figure 3:
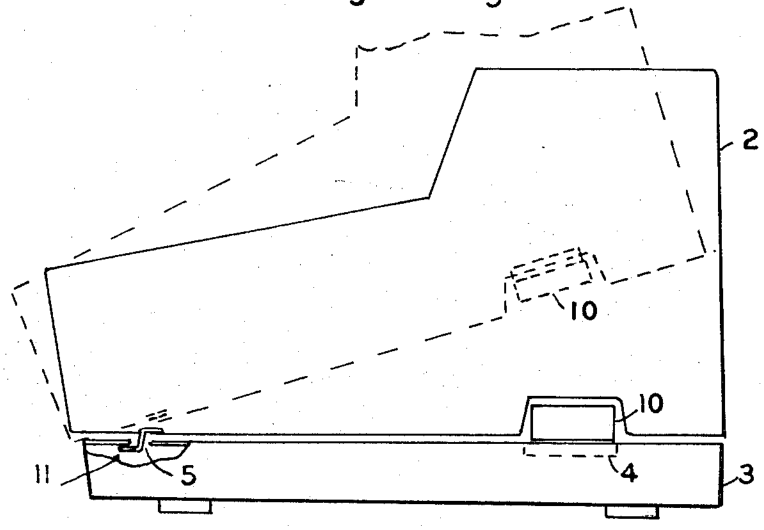
FIG. 3, is a side detail view showing the plug and socket connections to the tray.

FIG. 3 shows a side detail view of a tray 3, showing the socket 4, which is adapted to receive the plug 10, of the reproducer 2.

These are multi-contact plugs and sockets, and may have for instance, twenty-one contacts. Each tray is adapted to be connected to a wall socket for its own power.

The tray has a slot 5, for aligning plug and socket connections and the reproducer has an indexing projection 11, which is adapted to fit into slot 5. When inserting the reproducer, it is held at an angle, as shown by the dotted lines so that projection 11, is engaged in slot 5. Reproducer 2, is then moved downwardly and the plug and socket connection made.

Figure 4:
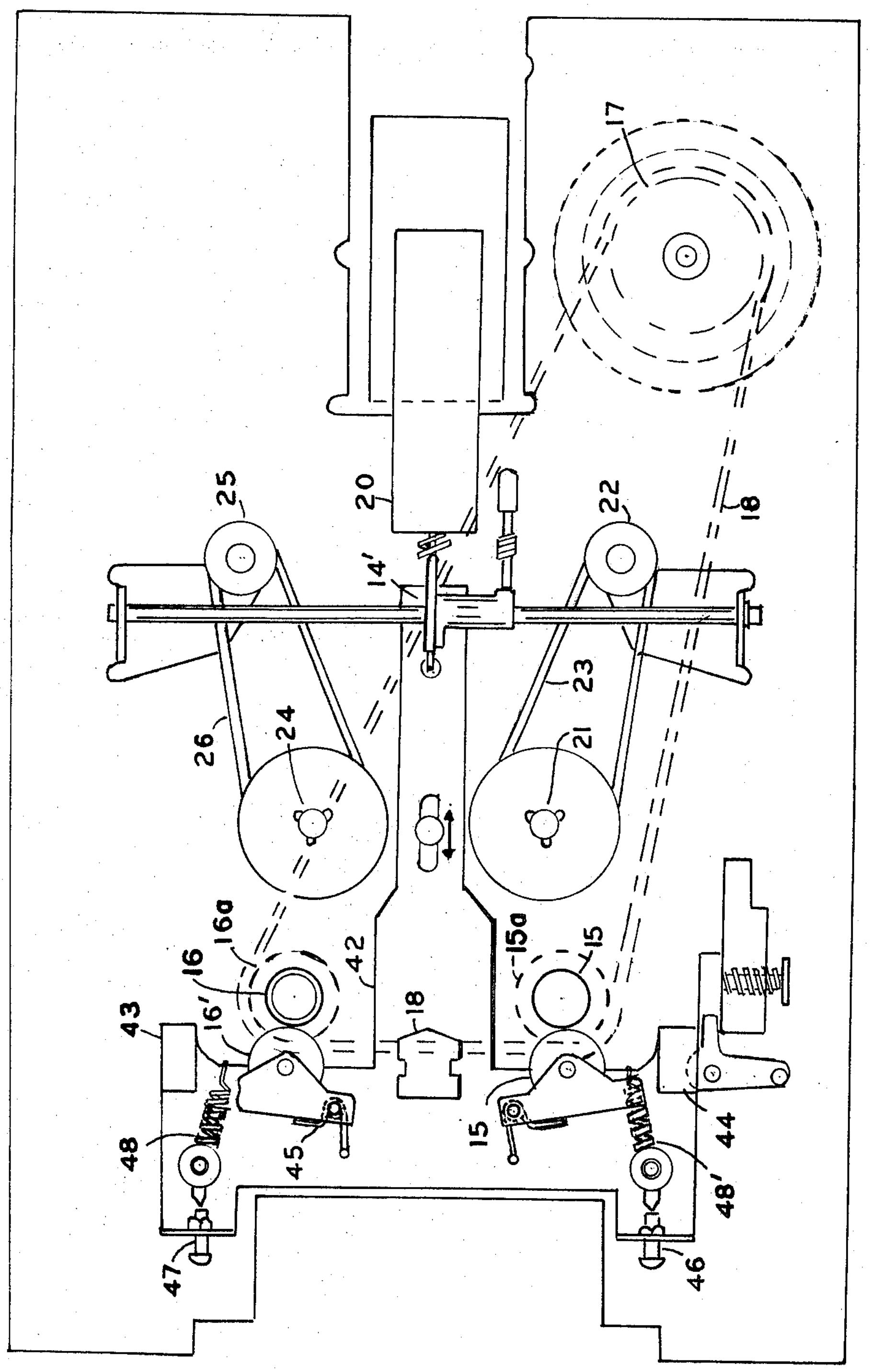
FIG. 4, is a top view of a reproducer drive deck with the cassette holder omitted.

FIG. 4 shows a top view of the cassette operating deck with the cassette holder omitted. FIG. 5 shows a side view of FIG. 4 with the cassette holder 14, in raised position.

The cassette is inserted in the front of the cassette holder 14, when it is in the raised position. The holder 14, is then lowered down so that the tape is engaged between the capstans 15 and 16 and the pivotally mounted spring loaded pinch rollers, 15′ and 16′. The capstans are driven by the motor 17, by the means of the belt 18, which extends around the capstan pulleys 15*a* and 16*a*. The tape passes in operative contact with the magnetic head 18, which is a pickup in the master unit and a recorder in the reproducing units. Otherwise, the master units and reproducer units are substantially identical in mechanical details. The pinch rollers and the magnetic head 18 are mounted on the slidable plate 42. This plate also carries cassette indexing blocks 43 and 44. The plate 42 is operated by the solenoid 20. When the plate is moved to the right in FIG. 4 the head 18 and the pinch rollers are moved into openings in the cassette. The pinch rollers are spring loaded by springs 45. The adjustment screws 46 and 47 adjust the head depth. The springs 48 and 48' are connected to return the plate 42 to out position. The cassette holder is held in position by the latch 27 which is adapted to be operated by the eject solenoid 27'. The take-up drive shaft 21, is driven by the forward motor 22, and the belt 23. The rewind drive shaft 24, is driven by the rewind motor 25, by means of the belt 26. The forward and rewind drive shafts engage the appropriate reels in the conventional cassette when the cassette holder is in the lowered position. The cassette is adapted to be ejected by the ejector latch 14'.

Figure 6:
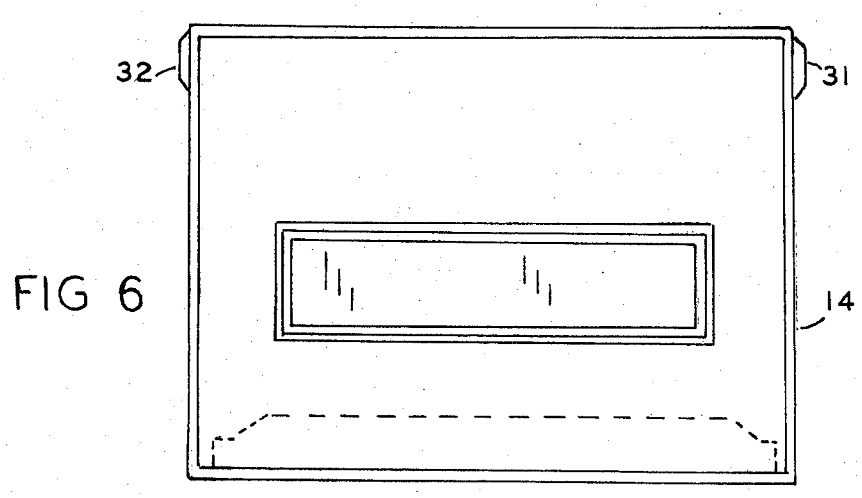
FIGS. 6 and 6A are detail views of the cassette holder.
Figure 6A:
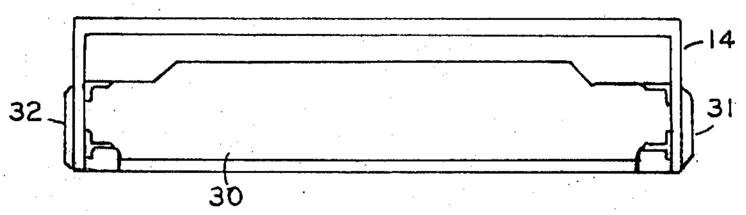

FIGS. 6 and 6A show the top and front views of the cassette holder 14. A conventional cassette, not shown, is inserted in the slot 30, in the front of the holder. The cassette holder is pivotally mounted by means of the projections 31 and 32, which fit into corresponding holders mounted on the tape holder deck. When the latch 27, is released by solenoid 27', the spring 41, pushes the holder 14, to up position and the cassette, now shown is ejected by bell crank 14' and solenoid 20.

Figure 7:
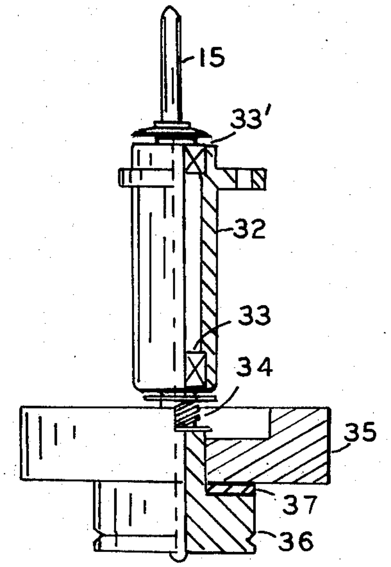
FIG. 7, is a detail view of the capstan.

FIG. 7 shows a detail view of the capstans. The capstan shaft 15, is mounted to the frame F by means of ball-bearings 33' and 33. A spring 34 pre-loads the bearings, the spring being located between the bearings 33 and the fly wheel 35. The shaft is driven by means of a pulley 36, which is separated from the fly wheel by means of a felt washer 37.

The twin capstans bridge the head 18, assembly, FIG. 4, and thus provide a closed loop drive for the magnetic tape. Such drives effectually isolate the tape inside the loop from outside influences, and thus minimize the flutter which is caused by cassettes.

A single belt 18, from the capstan motor 17, drives both capstans, FIG. 4. Because of the differing drive belt tension at each capstan pulley, the capstan on the supply side of the head assembly will tend to rotate slightly slower than the capstan on the takeup side. This provides a secondary advantage of maintaining a virtually constant tape tension across the head assembly, 18.

Capstans employ ball-bearings to provide less maintenance costs and longer life. Springs are used to preload the ball-bearings, and thus reduce flutter by preventing radial looseness.

To minimize any effects of resonant oscillation at the capstan, a damped capstan flywheel is employed. Details on the capstan assembly are shown in FIG. 7.

Damping is achieved by using a thick felt washer 37, between the capstan pulley 36 and flywheel 33, FIG. 7. The pulley is secured tightly to the capstan shaft, but the flywheel is free to rotate. In the operating position of the transport, the weight of the flywheel, pressing down on the felt washer, provides the coupling between flywheel and pulley.

All drive systems have a natural resonant frequency. Without damping, a sudden, instantaneous distrubrance of the drive system (power surge, tape bind in cassette, etc.) would start the capstan oscillating at its resonant frequency; a ringing effect would then occur which would continue until the drive system once more settled down to normal operation. The function of damping is to minimize the ringing effect so that the drive system is returned to normal in much less time. The inertia of the heavy, floating, flywheel makes it unresponsive to an instantaneous variation in the capstan drive system; when the cause of such variation is removed, it quickly damps out any ringing effect.

Figure 8:
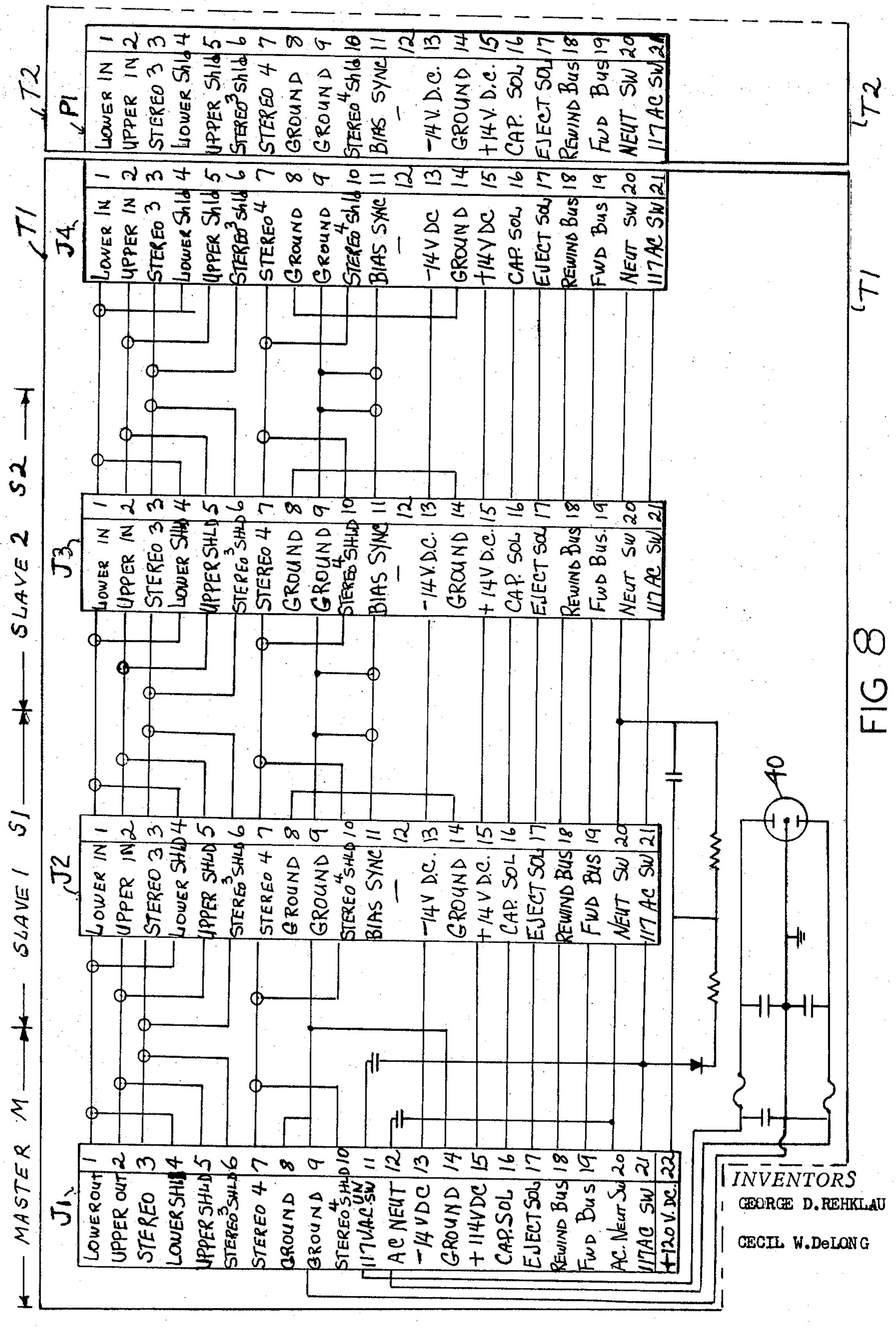
FIG. 8, is a schematic block wiring and diagram of the electrical connections in the tray.

FIG. 8, shows a schematic block diagram of a typical wiring arrangement for the tray. The tray accommodates one master reproducer M, and two slave reproducers S1 and S 2. The tray has a first socket or jack J.1, for accommodating the plug from the master reproducer. This may be a conventional 24 contact plug having appropriate connections for control of the electrical apparatus, the details of which are outside the scope of the present invention. The tray has two other sockets or jacks J.2 and J.3, one each for the slave reproducers. Each of these jacks utilize 21 contacts as shown. The tray has a third jack J.4, which is adapted to accommodate a plug P1 on another tray T2.

The tray has its own power supply including the plug 40, which is plugged into a conventional socket for 117 volts A.C. This plug is connected through conventional filter condenser to contacts 11 and 12 of the jack, J.1, to provide power.

The detailed electrical connections are outside the scope of the present invention. The general technique is to connect the respective units in parallel, with the corresponding units in the master unit. For instance, the contacts, 1, 2 and 3 of the jacks, provide one set of audio connections. Contacts 4, 5 and 6, are connected to shields of 1, 2 and 3. Likewise all the capstans drives are connected in parallel so that when the master is actuated, the slave capstans are actuated. Also, the takeup and supply motors and the control solenoids would also be connected in parallel to be actuated from the master reproducer control panel. The power supplies may be conventional, except, that if a large number of copies are simultaneously made, special provisions should preferably be made to regulate the power supply. However, this is outside the scope of the present invention.

Most pinch rollers used in conventional equipment employ a rotating bearing in the idler. Centrifugal force in idlers so constructed results in the oil in the bearing being forced out of the bearing surface. This results in galling of the bearing and shaft, with consequent flutter.

Figure 9:
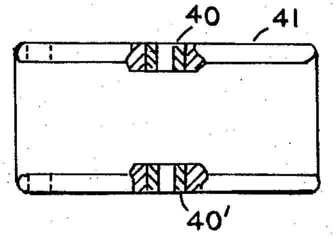
FIG. 9, is a detail view of the pinch roller bearing

On the present cassette-to-cassette duplicator, FIG. 9, sleeve bearings 40 and 40', of permanently lubricated sintered bronze support the shaft at the top and bottom of the pinch roller Frame 41'. These bearings are stationary, with the shaft only rotating. Construction of the pinch roller assembly is shown, in FIG. 9.

FIG. 10 shows a schematic electrical diagram of the motor and solenoid control in the master unit and contains the following manually operated switches:

S.1. Power switch.
S.3. Run switch.
S.4. Fast forward switch.
S.5. Rewind switch.
S.7. Eject switch.

All the push button control switches are mechanically interlocked so that pushing one down causes the others to rise thereby switching the circuit, for instance, from forward to reverse. The capstan motor 17 is operated and controlled by the power switch S1. The forward motor switch 21 is operated by the switch S3. Switch S3 is a two pole switch which also applies DC to the run solenoid 20. The rewind or reverse motor 24 is operated by the switch S5. The eject solenoid 27 is operated by the switch S7. Switch S6 is a torque control switch which is operated by the run solenoid 20. In "run" position S6 is open thereby inserting the resistor R9 into the circuit of the forward motor 21 so that this motor operates as a take-up motor with small torque. Switch S4 applies full torque to forward motor 21.

FIG. 11 is a schematic circuit of the slave units. The connections are the same as the master unit except that switch S8 is connected to disconnect all three motors. Otherwise, all the controls are in parallel with the master control switches. The purpose of disconnect switch S8 is to remove one of the slaves from operation if there is some malfunction without interference in operation of the master or any of the other slave units.

FIG. 12, shows a bottom view of the Cassette holder. The cassette is inserted in the slot 30 and is pushed into place against the ejector plate 50, which is spring loaded by the springs 51 and 52. The plate 50 is latched by the latch 14'. When the cassette is finished the upward movement of the cassette holder trips the latch 14' and the cassette is ejected by the ejector springs 51 and 52. The springs 53 and 54 are cassette hold-down springs.

We claim:

1. Cassette to cassette duplicating means, comprising, a master casette reproducer for reproducing a program from a master tape, a plurality of slave cassette reproducers to record said program on slave tapes, said master slave and reproducer having plug-in connection means, a tray adapted to mount one master reproducer and a plurality of slave reproducers, said tray having a plurality of inter-connected sockets to receive said plug-in connections of said master and said slave reproducers, wherein said reproducers have capstans mounted on ball-bearings and spring means connected to preload the ball-bearings to reduce flutter by preventing radial looseness.

2. Apparatus as in claim 1 having a damped fly wheel connected to said capstans to minimize any flutter caused by resonant oscillation of the capstans.

3. Apparatus as in claim 2 having pinch rollers adapted to bear against said capstans, said pinch rollers being mounted in stationary bearings not requiring oil.

4. Apparatus as in claim 1 wherein said reproducers have a pair of twin capstans.

* * * * *